United States Patent
Yang et al.

(10) Patent No.: US 10,912,027 B2
(45) Date of Patent: Feb. 2, 2021

(54) SCANNING METHOD AND DEVICE

(71) Applicant: Huawei Technologies Co., Ltd., Shenzhen (CN)

(72) Inventors: Jun Yang, Shenzhen (CN); Xiyu Zhou, Shanghai (CN); Jian Chen, Shanghai (CN); Ya Zhang, Shanghai (CN); Jiaxin Li, Shanghai (CN); Bingjian Du, Shanghai (CN); Yeqin Zhang, Shenzhen (CN); Ping Wei, Shanghai (CN); Zhiqiang Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/494,562

(22) PCT Filed: Mar. 14, 2017

(86) PCT No.: PCT/CN2017/076626
§ 371 (c)(1),
(2) Date: Sep. 16, 2019

(87) PCT Pub. No.: WO2018/165862
PCT Pub. Date: Sep. 20, 2018

(65) Prior Publication Data
US 2020/0015163 A1   Jan. 9, 2020

(51) Int. Cl.
*H04W 52/02*   (2009.01)
*H04W 4/80*   (2018.01)
*H04W 8/00*   (2009.01)

(52) U.S. Cl.
CPC ......... *H04W 52/0212* (2013.01); *H04W 4/80* (2018.02); *H04W 8/005* (2013.01)

(58) Field of Classification Search
CPC ... H04W 52/0212; H04W 52/02; H04W 4/80; H04W 8/005; H04W 4/38; H04W 4/02; H04W 8/00
See application file for complete search history.

(56) References Cited

U.S. PATENT DOCUMENTS

| 10,701,545 B2* | 6/2020 | Jiang ..................... H04W 8/005 |
| 2013/0090061 A1* | 4/2013 | Linde ................ H04W 52/0229 |
| | | 455/41.2 |

(Continued)

FOREIGN PATENT DOCUMENTS

| CN | 103686610 A | 3/2014 |
| CN | 105072565 A | 11/2015 |

(Continued)

OTHER PUBLICATIONS

Machine Translation and Abstract of Chinese Publication No. CN105072565, Nov. 18, 2015, 22 pages.

(Continued)

*Primary Examiner* — Syed Ali
(74) *Attorney, Agent, or Firm* — Conley Rose, P.C.

(57) ABSTRACT

A first device obtains an advertising parameter used by a second device to send an advertising data packet, where the advertising parameter includes an advertising window and an advertising interval. The first device determines, based on the advertising window and the advertising interval by using a preset scanning model, a target scan parameter used by the first device, where the target scan parameter is a scan parameter used by the first device when power consumption of the first device is a preset threshold and a scan-to-discover time period satisfies a preset condition. The target scan parameter includes a target scan window and a target scan interval. The first device performs scanning based on the target scan window and the target scan interval.

17 Claims, 7 Drawing Sheets

(56) References Cited

U.S. PATENT DOCUMENTS

| | | | |
|---|---|---|---|
| 2014/0086125 A1* | 3/2014 | Polo | H04W 52/0229 370/311 |
| 2014/0155050 A1 | 6/2014 | Choi et al. | |
| 2014/0179233 A1* | 6/2014 | Kang | H04W 4/18 455/41.2 |
| 2015/0106175 A1* | 4/2015 | Kang | H04W 4/80 705/14.4 |
| 2015/0223047 A1 | 8/2015 | Abraham et al. | |
| 2015/0271625 A1* | 9/2015 | Chen | H04W 4/80 370/328 |
| 2015/0382304 A1* | 12/2015 | Park | H04W 52/0248 455/41.2 |
| 2016/0095156 A1 | 3/2016 | Mitra et al. | |
| 2016/0100276 A1* | 4/2016 | Viswanadham | H04W 8/005 455/41.2 |
| 2016/0278006 A1* | 9/2016 | Lee | H04W 48/18 |
| 2017/0006538 A1* | 1/2017 | Liu | H04W 52/0229 |
| 2017/0006557 A1 | 1/2017 | Liu | |
| 2017/0041868 A1 | 2/2017 | Palin et al. | |
| 2017/0245204 A1* | 8/2017 | Kumar | H04W 48/16 |
| 2017/0285788 A1* | 10/2017 | Park | H04W 52/267 |
| 2020/0092926 A1* | 3/2020 | Li | H04W 76/14 |

FOREIGN PATENT DOCUMENTS

| | | |
|---|---|---|
| CN | 105940689 A | 9/2016 |
| CN | 106412804 A | 2/2017 |
| CN | 106454996 A | 2/2017 |

OTHER PUBLICATIONS

Machine Translation and Abstract of Chinese Publication No. CN106412804, Feb. 15, 2017, 25 pages.

Bluetooth Specification, "Master Table of Contents and Compliance Requirements," Version 4.2 [vol. 0], Dec. 2, 2014, pp. 2772.

Foreign Communication From A Counterpart Application, Chinese Application No. 201780007689.2, Chinese Office Action dated Dec. 4, 2019, 8 pages.

Foreign Communication From A Counterpart Application, PCT Application No. PCT/CN2017/076626, English Translation of International Search Report dated Dec. 5, 2017, 2 pages.

Foreign Communication From A Counterpart Application, PCT Application No. PCT/CN2017/076626, English Translation of Written Opinion dated Dec. 5, 2017, 4 pages.

* cited by examiner

SCANNING METHOD AND DEVICE

CROSS-REFERENCE TO RELATED APPLICATIONS

This application is a national stage of International Application No. PCT/CN2017/076626, filed Mar. 14, 2017, which is hereby incorporated by reference in its entirety.

TECHNICAL FIELD

Embodiments of this application relate to the field of communications technologies, and in particular, to a scanning method and a device.

BACKGROUND

With the development of communications technologies, more devices use a Bluetooth low energy (Bluetooth Low Energy, BLE) technology to complete wireless communication.

A BLE system includes a BLE scanning device and a BLE advertising device. The BLE advertising device sends an advertising data packet based on an advertising window and an advertising interval through an advertising channel. The BLE scanning device performs scanning based on a scan window and a scan interval to obtain the advertising data packet sent by the BLE advertising device. After the BLE scanning device obtains the advertising data packet sent by the BLE advertising device, a device discovery process is completed between the BLE scanning device and the BLE advertising device. The scan interval and the scan window determine power consumption of the BLE scanning device. All of the advertising interval, the advertising window, the scan interval, and the scan window may affect a scan-to-discover time period, and the scan-to-discover time period is a time period from starting scanning by the BLE scanning device to obtaining, for the first time, an advertising data packet sent by the BLE advertising device.

In the prior art, a BLE scanning device stores several preset scan parameter groups, and each scan parameter group includes a scan interval and a scan window. The BLE scanning device scans a BLE advertising device by using one of the preset scan parameter groups. However, during actual application, different BLE advertising devices use different advertising intervals and different advertising windows; therefore, when a BLE scanning device scans a BLE advertising device by using one of the preset scan parameter groups, a balance between a scan-to-discover time period and power consumption of the BLE scanning device may not be implemented. For example, for a BLE advertising device, a scan-to-discover time period used by the BLE scanning device may be relatively long, and power consumption is relatively small; or a scan-to-discover time period may be relatively short, and power consumption is relatively large.

SUMMARY

This application provides a scanning method and a device, to overcome an imbalance between a scan-to-discover time period and power consumption of a scanning device.

To achieve the foregoing objective, the following technical solutions are used in this application.

According to a first aspect, a scanning method is provided. After obtaining an advertising window and an advertising interval that are used by a second device to send an advertising data packet, a first device determines, by using a preset scanning model and based on the advertising window and the advertising interval that are obtained, a target scan window and a target scan interval that are used by the first device when power consumption of the first device is a preset threshold and a scan-to-discover time period satisfies a preset condition. Then, the first device can perform scanning based on the target scan window and the target scan interval.

All of the advertising window, the advertising interval, the scan window, and the scan interval affect a scan-to-discover time period, and the scan window and the scan interval determine the power consumption of the first device. When determining the target scan window and the target scan interval, the first device considers not only the advertising window and the advertising interval, but also the power consumption of the first device. Therefore, when determining the target scan window and the target scan interval, the first device considers both a scan-to-discover time period and the power consumption of the first device, implementing a balance between the scan-to-discover time period and the power consumption of the first device.

Optionally, in a possible implementation of this application, a method for obtaining, by a first device, an advertising window and an advertising interval is: sending, by the first device to a server, a request message carrying an identifier of a second device, to request to obtain the advertising window and the advertising interval, where the server stores the advertising window and the advertising interval; and receiving, by the first device, a response message that carries the advertising window and the advertising interval and that is sent by the server.

Optionally, in another possible implementation of this application, both the advertising window and the advertising interval that are obtained by the first device are prestored by the first device. Both the advertising window and the advertising interval that are prestored by the first device are obtained and stored by the first device during previous communication with the second device. Herein, a method for obtaining and storing, by the first device, the advertising window and the advertising interval may be: performing scanning by the first device based on a preset scan parameter, to obtain at least two advertising data packets sent by the second device; after obtaining the at least two advertising data packets, determining, by the first device, a time point for each of the at least two advertising data packets, and calculating the advertising window and the advertising interval based on the determined time points. Then, the first device can store the advertising window and the advertising interval. A method for obtaining and storing, by the first device, the advertising window and the advertising interval may alternatively be: performing scanning by the first device based on a preset scan parameter, to obtain at least one advertising data packet sent by the second device, where each of the at least one advertising data packet carries the advertising window and the advertising interval; and obtaining, by the first device, the advertising window and the advertising interval from any advertising data packet obtained by the first device. Then, the first device can store the advertising window and the advertising interval.

Optionally, in another possible implementation of this application, the preset condition is that a time period is shortest, and a method for determining, by a first device based on the advertising window and the advertising interval by using a preset scanning model, a target scan parameter used by the first device is: determining, by the first device, a plurality of scan parameter groups based on the preset threshold, where each of the plurality of scan parameter groups includes a scan window and a scan interval, the preset threshold is a functional value of a first function, and an independent variable of the first function is a ratio of the scan window to the scan interval; determining, by the first device based on the advertising window and the advertising interval by using the scanning model, a first scan-to-discover time period corresponding to each scan parameter group to obtain a plurality of first scan-to-discover time periods; determining, by the first device, a first scan-to-discover time period that is the shortest among the plurality of first scan-to-discover time periods as a target scan-to-discover time period; and determining, by the first device, a scan parameter corresponding to the target scan-to-discover time period as the target scan parameter.

Optionally, in another possible implementation of this application, a method for determining, by the first device based on the advertising window and the advertising interval by using the preset scanning model, a first scan-to-discover time period corresponding to each scan parameter group, to obtain a plurality of first scan-to-discover time periods is: for each of the plurality of scan parameter groups, performing, by the first device, the following steps to obtain the plurality of first scan-to-discover time periods: determining, by the first device, at least one scanning start time point; determining, by the first device, a time difference set based on one of the plurality of scan parameter groups, where the time difference set includes at least one time difference, and a $j^{th}$ time difference in the at least one time difference is used to represent a difference between a $j^{th}$ scanning start time point in the at least one scanning start time point and an advertising start time point, where $j \geq 1$; calculating, by the first device based on the advertising window, the advertising interval, and the one scan parameter group by using the scanning model, a second scan-to-discover time period corresponding to each of the at least one time difference, to obtain a plurality of second scan-to-discover time periods; and calculating, by the first device, the calculated second scan-to-discover time periods by using a preset algorithm, to obtain a first scan-to-discover time period corresponding to the one scan parameter group.

According to a second aspect, a scanning device is provided, where the scanning device is the foregoing first device, and the scanning device includes an obtaining unit, a determining unit, and a scanning unit.

Details of functions implemented by the unit modules provided in this application are as follows:

The obtaining unit is configured to obtain an advertising parameter used by a second device to send an advertising data packet, where the advertising parameter includes an advertising window and an advertising interval; the determining unit is configured to determine, by using a preset scanning model and based on the advertising window and the advertising interval that are obtained by the obtaining unit, a target scan parameter used by the first device, where the target scan parameter is a scan parameter used by the first device when power consumption of the first device is a preset threshold and a scan-to-discover time period satisfies a preset condition, and the target scan parameter includes a target scan window and a target scan interval; and the scanning unit is configured to perform scanning based on the target scan window and the target scan interval that are determined by the determining unit.

Further, in a possible implementation of this application, the obtaining unit is specifically configured to: send, to a server, a request message carrying an identifier of the second device, to request to obtain the advertising window and the advertising interval, where the server stores the advertising window and the advertising interval; and receive a response message that is sent by the server and that carries the advertising window and the advertising interval.

Further, in another possible implementation of this application, the preset condition is that a time period is shortest, and the determining unit is specifically configured to: determine a plurality of scan parameter groups based on the preset threshold, where each of the plurality of scan parameter groups includes a scan window and a scan interval, the preset threshold is a functional value of a first function, and an independent variable of the first function is a ratio of the scan window to the scan interval; determine, based on the advertising window and the advertising interval by using the scanning model, a first scan-to-discover time period corresponding to each scan parameter group, to obtain a plurality of first scan-to-discover time periods; determine a first scan-to-discover time period that is the shortest among the plurality of first scan-to-discover time periods as a target scan-to-discover time period; and determine a scan parameter corresponding to the target scan-to-discover time period as the target scan parameter.

Further, in another possible implementation of this application, for each of the plurality of scan parameter groups, the determining unit is specifically configured to: determine at least one scanning start time point; determine a time difference set based on one of the plurality of scan parameter groups, where the time difference set includes at least one time difference, and a $j^{th}$ time difference in the at least one time difference is used to represent a difference between a $j^{th}$ scanning start time point in the at least one scanning start time point and an advertising start time point, where $j \geq 1$; calculate, based on the advertising window, the advertising interval, and the one scan parameter group by using the scanning model, a second scan-to-discover time period corresponding to each of the at least one time difference, to obtain a plurality of second scan-to-discover time periods; and calculate the plurality of second scan-to-discover time periods by using a preset algorithm, to obtain a first scan-to-discover time period corresponding to the one scan parameter group.

According to a third aspect, a scanning device is provided, where the scanning device includes a processor, a memory, and a communications interface, where the memory is configured to store computer program code, the computer program code includes instructions, the processor, the communications interface, and the memory are connected by using a bus, and when the scanning device runs, the processor executes the instructions stored in the memory, so that the scanning device performs the scanning method according to the first aspect and the possible implementations of the first aspect.

According to a fourth aspect, a computer-readable storage medium is further provided, where the computer-readable storage medium further includes one or more groups of program code, and when a processor of a scanning device executes the program code, the scanning device performs the scanning method according to any one of the first aspect and the possible implementations of the first aspect.

According to a fifth aspect, a computer program product including instructions is further provided, where when the computer program product runs on a scanning device, the scanning device performs the scanning method according to any one of the first aspect and the possible implementations of the first aspect.

In this application, the name of the scanning device constitutes no limitation on the devices or the function modules. During actual implementation, the devices or function devices may appear in other names. Provided that functions of the devices or function modules are similar to those in this application, the devices or function modules fall within the scope of the claims of this application and equivalent technologies thereof.

For specific descriptions of the second aspect, the third aspect, the fourth aspect, the fifth aspect, and the implementations thereof, refer to detailed descriptions in the first aspect and the implementations thereof; in addition, for beneficial effects of the second aspect, the third aspect, the fourth aspect, the fifth aspect, and the implementations thereof, refer to analysis of beneficial effects in the first aspect and the implementations thereof. Details are not described herein again.

The aspects and other aspects of the embodiments of this application are clearer and easier to understand in the following descriptions.

DESCRIPTION OF EMBODIMENTS

Figure 1:
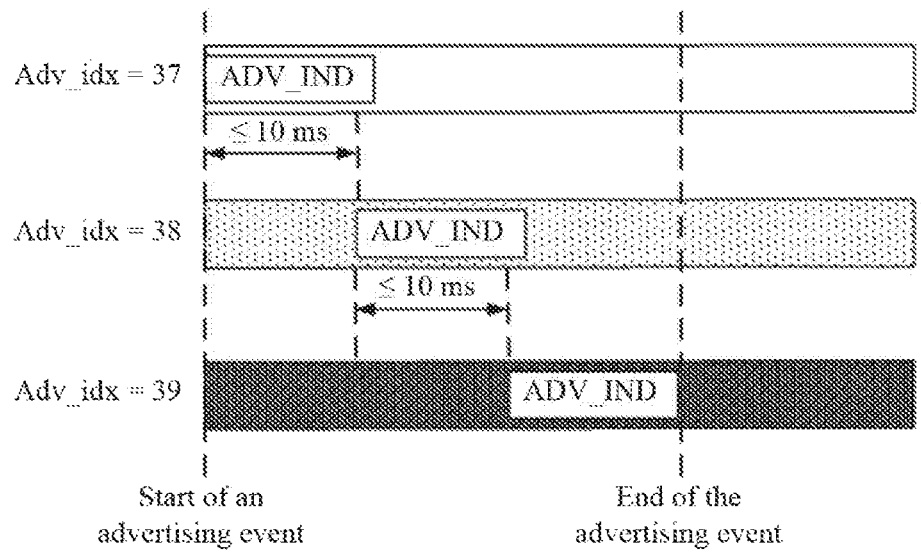
FIG. 1 is a schematic diagram of an advertising event in a BLE system in the prior art.

The following describes in detail the technical solutions in the embodiments of this application with reference to the accompanying drawings in the embodiments of this application.

In the specification, claims, and accompanying drawings of this application, the terms "first". "second", "third", "fourth", and so on are intended to distinguish between different objects, but do not indicate a particular order.

The term "and/or" in the embodiments of this application describes only an association relationship for describing associated objects and represents that three relationships may exist. For example, A and/or B may represent the following three cases: Only A exists, both A and B exist, and only B exists.

In the embodiments of this application, the word such as "example" or "for example" is used to represent giving an example, an illustration, or a description. Any embodiment or design scheme described as an "example" or "for example" in the embodiments of this application shall not be explained as being more preferred or having more advantages than another embodiment or design scheme. Exactly, use of the word "example", "for example", or the like is intended to present a relative concept in a specific manner.

BLE works in a 2.4-gigahertz (GHz) public industrial, scientific, and medical (Industrial Scientific Medical, ISM) band. The 2.4 GHz IMS band is divided into 40 radio frequency (Radio Frequency, RF) channels, and a width of each RF channel is 2 megahertz (MHz). Among the 40 RF channels, channels numbered 37, 38, and 39 are advertising channels, and are used to send BLE advertising data packets; and remaining 37 channels other than the advertising channels are data channels, and are configured to transmit user data.

In a BLE system, a BLE advertising device may choose at least one of the foregoing advertising channels to send an advertising data packet. When each advertising event occurs, the BLE advertising device sends an advertising data packet over each of the advertising channels (a maximum of three advertising channels) selected by the BLE advertising device. Duration of each advertising event is the same as a length of an advertising window. BLE advertising includes connectable directed advertising and connectable undirected advertising.

An advertising event during connectable directed advertising needs to be repeated once every 3.75 milliseconds (ms), that is, the BLE advertising device sends a directed advertising data packet over each of three advertising channels every 3.75 ms. In this way, a BLE scanning device can obtain, by performing scanning only for 3.75 ms, the directed advertising data packet sent by the BLE advertising device.

There is a time interval of 20 ms to 10.28 seconds (s) between any two adjacent advertising events during connectable undirected advertising, and the time interval is referred to as an advertising interval. In an advertising event during connectable undirected advertising, a time interval between undirected advertising data packet sending over any two adjacent advertising channels of the three advertising channels is less than or equal to 10 ms, and a specific interval value depends on implementation of the BLE advertising device. In addition, for any BLE advertising device, to avoid interference caused by performing advertising simultaneously by devices of a similar type for a very long period of time, the BLE advertising device adds a random delay of 0 ms to 10 ms after each advertising event, to proactively disturb a time point of a next advertising event. In this way, even if advertising intervals used by two different BLE advertising devices are the same and a conflict is caused when the two different BLE advertising devices send undirected advertising data packets at a same time point over a same channel, a conflict between the two BLE advertising devices can be avoided during a next advertising event.

FIG. 1 shows a complete advertising event during connectable undirected advertising. In FIG. 1, ADV_IND represents an undirected advertising data packet, and Adv_idx represents an RF channel number; therefore, Adv_idx=37 is used to represent an RF channel numbered 37 (which is referred to as a channel 1 for short in the embodiments of this application). Similarly, Adv_idx=38 is used to represent an RF channel numbered 38 (which is referred to as a channel 2 for short in the embodiments of this application), and Adv_idx=39 is used to represent an RF channel numbered 39 (which is referred to as a channel 3 for short in the embodiments of this application). All of the three RF channels are advertising channels. In an advertising event shown in FIG. 1, a BLE advertising device sends an undirected advertising data packet over the channel 1, the channel 2, and the channel 3 separately. A time interval between undirected data packet sending over the channel 1 and undirected data packet sending over the channel 2 is less than or equal to 10 ms, and similarly a time interval between undirected data packet sending over the channel 2 and undirected data packet sending over the channel 3 is less than or equal to 10 ms.

In the BLE system, for a BLE scanning device, a scan interval and a scan window are two extremely important parameters. The scan interval and the scan window may affect a scan-to-discover time period, and a ratio of the scan window to the scan interval (the ratio is referred to as a scanning duty ratio in the embodiments of this application) determines power consumption of the BLE scanning device in a scanning process. For each scan interval, the BLE scanning device is in a scanning state in a scan window within the scan interval; therefore, if a length of the scan window is equal to a length of the scan interval, the BLE scanning device performs scanning continuously. The BLE scanning device uses different scanning frequencies in any two adjacent scan intervals. The BLE scanning device scans only one advertising channel in each scan window, and different advertising channels are scanned by the BLE scanning device in any two adjacent scan windows.

It should be noted that in the BLE system, the BLE scanning device may also be used as a BLE advertising device, and similarly the BLE advertising device may also be used as a BLE scanning device. For ease of description, in this application, a device that is mainly used for advertising is referred to as a BLE advertising device, and a device that is mainly used for scanning is referred to as a BLE scanning device.

In the prior art, for each BLE advertising device, a BLE scanning device performs scanning by using a preset scan parameter group prestored by the BLE scanning device. However, different BLE advertising devices use different advertising intervals and different advertising windows, therefore, for a BLE advertising device, when a BLE scanning device performs scanning by using a preset scan parameter group, a balance between a scan-to-discover time period and power consumption of the BLE scanning device may not be implemented.

Regarding the foregoing technical problems, the embodiments of this application provide a scanning method and a device. A first device obtains an advertising window and an advertising interval that are used by a second device to send an advertising data packet, and determines, by using a preset scanning model and based on the advertising window and the advertising interval that are obtained, a target scan window and a target scan interval that are used by the first device when power consumption of the first device is a preset threshold and a scan-to-discover time period satisfies a preset condition. Then, the first device can perform scanning based on the target scan window and the target scan interval to discover the second device. Not only the advertising window and the advertising interval but also the power consumption of the first device is considered when the first device determines the target scan window and the target scan interval; therefore, when determining the target scan window and the target scan interval, the first device considers both the scan-to-discover time period and the power consumption of the first device, implementing a balance between the scan-to-discover time period and the power consumption of the first device.

Figure 2:
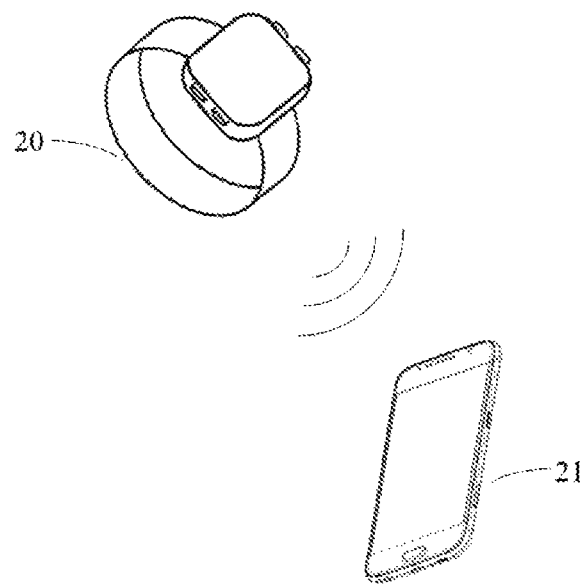
FIG. 2 is a schematic structural diagram of a communications system according to an embodiment of this application.

The scanning method provided in the embodiments of this application is applied to a communications system. FIG. 2 is a schematic structural diagram of a communications system according to an embodiment of this application. Referring to FIG. 2, the communications system includes a first device 20 and a second device 21, and the second device 21 may be wirelessly connected to the first device 20.

With reference to the foregoing descriptions, in this embodiment of this application, the first device 20 may be a BLE scanning device, and the second device 21 may be a BLE advertising device.

A connection manner between the second device 21 and the first device 20 may be a BLE manner, a Wireless Fidelity (Wireless-Fidelity, Wi-Fi) manner, a basic-rate (Basic Rate, BR) manner in traditional Bluetooth, or a Zigbee (Zigbee) manner. This is not specifically limited in this embodiment of this application.

The first device 20 or the second device 21 in this embodiment of this application may be a wearable device or an intelligent terminal.

The wearable device includes but is not limited to a smartwatch, a smart band, a smart wristband, smart glasses, a smart necklace, a smart ring, smart earrings, a smartphone, or another type of intelligent wearable device. During actual application, the wearable device may provide various available network connection capabilities such as Bluetooth (Bluetooth. BT), Wireless Fidelity (Wireless-Fidelity, Wi-Fi), Near Field Communication (Near Field Communication, NFC), and infrared (Infrared). Various sensors such as an accelerometer sensor, a gyroscope sensor, a magnetometer sensor, a light sensor, and a global positioning system (Global Positioning System, GPS) sensor, and input/output (Input/Output, I/O) components such as a microphone and a loudspeaker may be built in the wearable device. The wearable device can effectively detect user actions (for example, running and walking), user sign data (for example, a heart rate and blood pressure), and a place in which a user is located currently (that is, a current position of the user), and the like by using the foregoing types of sensors.

For example, in this embodiment of this application, the first device 20 shown in FIG. 2 may be a smartwatch. The following provides, with reference to FIG. 3, specific descriptions for constituent components of the smartwatch in an embodiment of this application.

Figure 3:
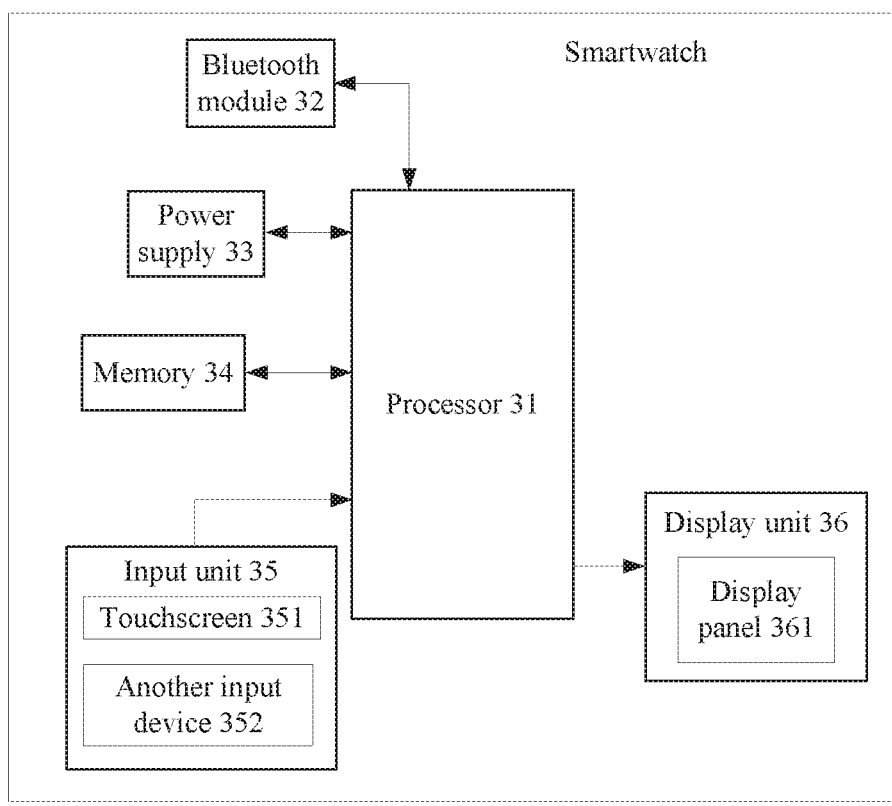
FIG. 3 is a schematic structural diagram of hardware of a smartwatch according to an embodiment of this application.

As shown in FIG. 3, the smartwatch includes components such as a processor 31, a Bluetooth module 32, a power supply 33, a memory 34, an input unit 35, and a display unit 36. A person skilled in the art can understand that the structure of the smartwatch shown in FIG. 3 constitutes no limitation on the smartwatch. The smartwatch may include more or fewer components than those shown in FIG. 3, a combination of some of the components shown in FIG. 3, or components deployed differently from the components shown in FIG. 3.

As a control center of the smartwatch, the processor 31 is connected to various components of the entire smartwatch by using various interfaces and lines, runs or executes a software program and/or module stored in the memory 34 and invokes data stored in the memory 34, to execute various functions of the smartwatch and processes data, so as to perform overall monitoring on the smartwatch. The processor 31 may include one or more processing units. Optionally, an application processor and a modem processor may be integrated into the processor 31. The application processor mainly processes an operating system, a user interface, an application program, and the like. The modem processor mainly processes wireless communication. Optionally, the modem processor and the application processor may alternatively be independent of each other.

The Bluetooth module 32 may be configured to connect to the second device 21 in a Bluetooth manner.

The smartwatch includes the power supply 33 (for example, a battery) supplying power to each component. Optionally, the power supply may be logically connected to the processor 31 by using a power management system, to implement functions such as charge and discharge management and power consumption management by using the power management system.

The memory 34 may be configured to store a software program and a module. The processor 31 runs the software program and the module that are stored in the memory 34, to execute various function applications and data processing of the smartwatch. The memory 34 may mainly include a program storage area and a data storage area. The program storage area may store an operating system, an application program required by at least one function (for example, a scanning function), and the like. The data storage area may store data (for example, audio data and a phone book) created according to use of the smartwatch, and the like. In addition, the memory 34 may include a high-speed random access memory, and may further include a non-volatile memory such as at least one disk storage device, a flash memory device, or another volatile solid-state storage device.

The input unit 35 may be configured to: receive entered digital or character information, and generate key signal input related to user settings and function control of the smartwatch. Specifically, the input unit 35 may include a touchscreen 351 and another input device 352. The touchscreen 351 is also referred to as a touch panel, and can collect touch operations performed by a user on or near the touchscreen 351 (for example, an operation performed by the user on or near the touchscreen 351 by using any proper object or accessory such as a finger or a stylus), and drive a corresponding connection apparatus according to a preset program. Optionally, the touchscreen 351 may include two components: a touch detection apparatus and a touch controller. The touch detection apparatus detects a touch position of the user, detects a signal brought by a touch operation, and transfers the signal to the touch controller. The touch controller receives touch information from the touch detection apparatus, converts the touch information into contact coordinates, and sends the contact coordinates to the processor 31; and can receive and execute a command sent by the processor 31. In addition, the touchscreen 351 may be implemented by using a plurality of types such as a resistor type, a capacitor type, an infrared type, and a surface acoustic wave type. The another input device 352 may include but is not limited to one or more of a physical keyboard, a function key (for example, a volume control key or an on/off key), a trackball, a mouse, a joystick, and the like.

The display unit 36 may be configured to display information entered by the user or information provided for the user, and various menus of the smartwatch. The display unit 36 may include a display panel 361. Optionally, the display panel 361 may be configured in a form of a liquid crystal display (Liquid Crystal Display, LCD), an organic light-emitting diode (Organic Light-Emitting Diode, OLED), or the like. Further, the touchscreen 351 may cover the display panel 361. After detecting a touch operation on or near the touchscreen 351, the touchscreen 351 transfers the touch event to the processor 31 to determine a touch event type. Subsequently, the processor 31 provides corresponding visual output on the display panel 361 based on the touch event type. Although the touchscreen 351 and the display panel 361 in FIG. 3 are used as two separate components to implement input and output functions of the smartwatch, in some embodiments, the touchscreen 351 and the display panel 361 may be integrated to implement the input and output functions of the smartwatch.

Optionally, the smartwatch may further include various sensors (for example, a gyroscope sensor, a hygrometer sensor, an infrared sensor, and a magnetometer sensor), a Wi-Fi module, and the like that are not shown in FIG. 3.

Figure 4:
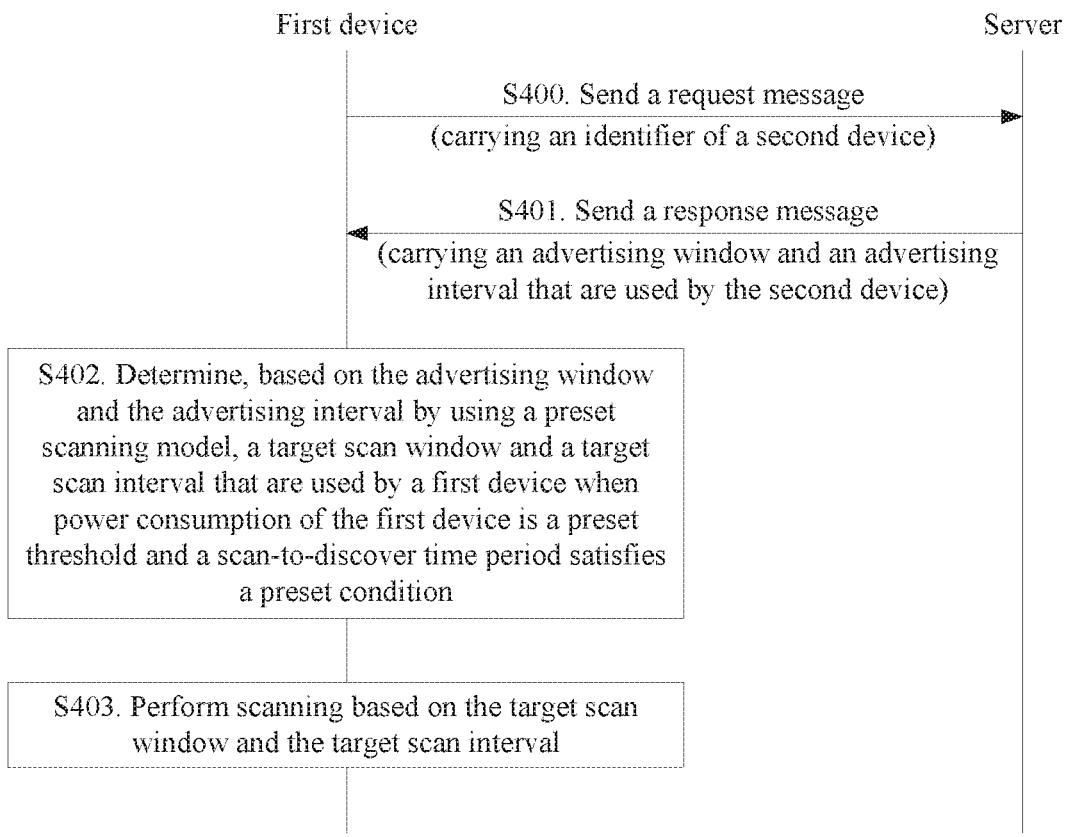
FIG. 4 is a schematic flowchart of a scanning method according to an embodiment of this application.

FIG. 4 is a schematic flowchart of a scanning method according to an embodiment of this application. The scanning method may be applied to the communications system show in FIG. 2.

Referring to FIG. 4, the scanning method includes the following steps.

S400. A first device sends, to a server, a request message carrying an identifier of a second device, to request to obtain an advertising window and an advertising interval that are used by the second device to send an advertising data packet.

S401. The server sends, to the first device, a response message carrying the advertising window and the advertising interval that are used by the second device.

S402. The first device determines, based on the advertising window and the advertising interval by using a preset scanning model, a target scan window and a target scan interval that are used by the first device when power consumption of the first device is a preset threshold and a scan-to-discover time period satisfies a preset condition.

S403. The first device performs scanning based on the target scan window and the target scan interval.

With reference to the foregoing descriptions, in this embodiment of this application, the first device may be the foregoing BLE scanning device, and the second device may be the foregoing BLE advertising device.

It can be learned from the foregoing descriptions that different BLE advertising devices use different advertising intervals and different advertising windows, and both the advertising interval and the advertising window affect a scan-to-discover time period. For any second device, the first device in this embodiment of this application obtains an advertising parameter used by the second device to send an advertising data packet. Specifically, the first device obtains the advertising window and the advertising interval that are used by the second device to send the advertising data packet, to determine, based on the advertising window and the advertising interval that are obtained, the target scan window and the target scan interval that are used by the first device to perform scanning for the advertising data packet sent by the second device.

Specifically, a method for obtaining, by the first device, the advertising window and the advertising interval that are used by the second device to send an advertising data packet may be: sending, by the first device to the server, a request message carrying an identifier of the second device, to request to obtain the advertising window and the advertising interval that are used by the second device to send the advertising data packet, where the server prestores the advertising window and the advertising interval that are used by the second device to send the advertising data packet; and correspondingly after receiving the request message, sending, by the server to the first device, the advertising window and the advertising interval that are used by the second device. Then, the first device can obtain the advertising window and the advertising interval that are used by the second device. That is, S400 and S401 are performed.

The server may be a cloud server or a background server of the first device. This is not specifically limited in this embodiment of this application.

For example, the first device is a smartphone, the second device is a smartwatch, the first device prestores an application program that matches the smartwatch, and the server is a background server. After a user of the first device starts the application program, the first device sends a request message carrying an identifier of the smartwatch to the background server, to request to obtain an advertising window and an advertising interval that are used by the smartwatch to send an advertising data packet. Correspondingly, after receiving the request message, the background server sends, to the smartphone, the advertising window and the advertising interval that are used by the smartwatch. Then, the smartphone can obtain the advertising window and the advertising interval that are used by the smartwatch.

Optionally, both the advertising window and the advertising interval that are obtained by the first device are prestored by the first device. Both the advertising window and the advertising interval that are prestored by the first device are obtained and stored by the first device during previous communication with the second device.

A method for pre-obtaining and storing the advertising window and the advertising interval by the first device may be: continuously scanning, by the first device, an advertising channel based on a preset scan parameter, and obtaining at least two advertising data packets transmitted over the advertising channel; and calculating, by the first device, an advertising interval based on time points at which the first device obtains the advertising data packets. In addition, after obtaining, for the first time, the advertising data packet sent over the advertising channel, the first device quickly changes to scan a next advertising channel. Then, the first device can determine an advertising window based on time points at which the first device obtains advertising data packets over different advertising channels.

In the method, the first device discovers the second device by performing scanning based on the preset scan parameter. In this case, a balance between a scan-to-discover time period and power consumption of the first device may not be implemented. Therefore, the first device stores the advertising interval and the advertising window that are calculated by the first device, to calculate a target scan parameter during subsequent communication with the second device. It should be noted that in the method, a hardware structure of the first device needs to support the first device in performing scanning and sampling to obtain the advertising window and the advertising interval that are used by the second device.

Optionally, a method for pre-obtaining and storing the advertising window and the advertising interval by the first device may alternatively be: performing, by the first device based on a preset scan parameter, scanning to discover the second device, and establishing, by the first device, a connection to the second device; and after establishing the connection between the first device and the second device, obtaining, by the first device, at least one advertising data packet sent by the second device, where each of the at least one advertising data packet carries an advertising window and an advertising interval; and obtaining, by the first device, an advertising window and an advertising interval from any advertising data packet obtained by the first device.

In the method, the first device has established the connection to the second device before obtaining the advertising window and the advertising interval, and the first device discovers the second device by performing scanning based on the preset scan parameter; therefore, an imbalance between the power consumption of the first device and the scan-to-discover time period may occur during this communication between the first device and the second device. After obtaining the advertising window and the advertising interval, the first device stores the advertising window and the advertising interval, to calculate the target scan parameter during subsequent communication with the second device.

After obtaining the advertising window and the advertising interval that are used by the second device, the first device determines, by using the preset scanning model, the target scan window and the target scan interval that are used by the first device when the power consumption of the first device is the preset threshold and the scan-to-discover time period satisfies the preset condition. Then, the first device can perform scanning based on the target scan window and the target scan interval to implement a balance between the scan-to-discover time period and the power consumption of the first device. That is, the first device performs S402 and S403.

With reference to the foregoing descriptions, all channels numbered 37, 38, and 39 are advertising channels, and the second device may choose to send an advertising data packet over a maximum of three advertising channels. That is, the second device sends an advertising data packet over each of the three advertising channels. Therefore, the advertising window may completely cover a maximum of three advertising channels. The first device scans only one advertising channel in each scan window, and different advertising channels are scanned by the first device in any two adjacent scan windows. Therefore, in the advertising event in which the second device sends an advertising data packet over each of the three advertising channels, if the scan window can completely cover the three advertising channels, the first device may discover, through scanning, an advertising data packet sent by the second device over an advertising channel.

In the advertising event in which the second device sends an advertising data packet over each of the three advertising channels, if the scan window can completely cover the three advertising channels, the first device may discover, through scanning, an advertising data packet sent by the second device over an advertising channel, and construct a preset scanning model mentioned in this embodiment of this application.

Figure 5:
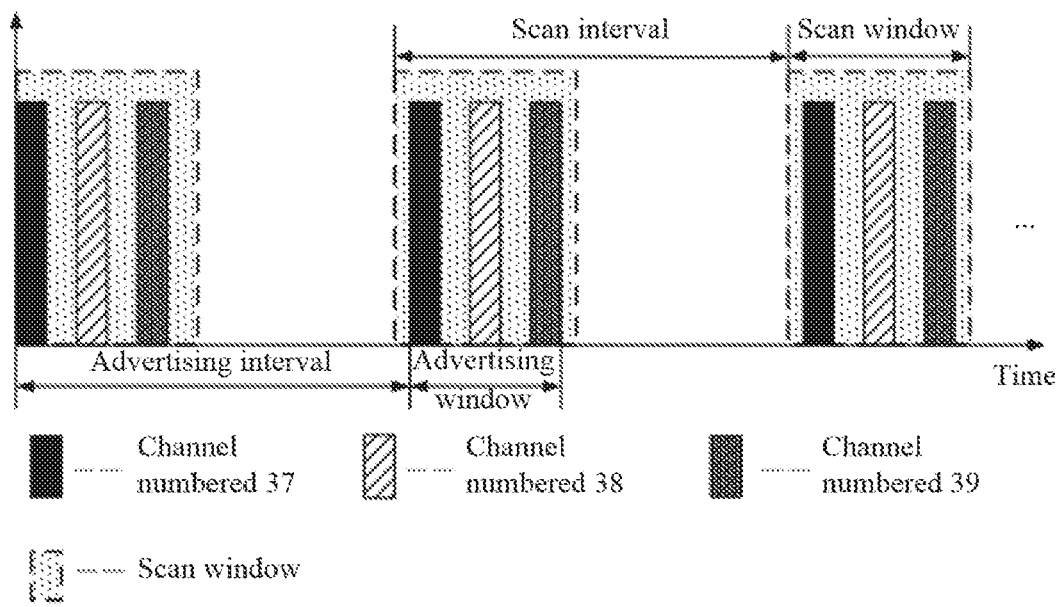
FIG. 5 is schematic diagram 1 of a scanning model according to an embodiment of this application.

As shown in FIG. 5, a start time point of an advertising event is used as an origin of coordinates, a horizontal axis represents time, and a longitudinal axis represents whether advertising or scanning is being performed. In this embodiment of this application, if advWindow represents an advertising window, advinterval represents an advertising interval, scanWindow represents a scan window, scaninterval represents a scan interval, Yadv=1 represents that advertising is being performed, and Yscan=1 represents that scanning is being performed, an advertising formula may be expressed as:

$$Yadv = \begin{cases} 1, & t = [0, advWindow) + advinterval \times N, \quad N = 0, 1, 2, \ldots \\ 0, & t \neq [0, advWindow) + advinterval \times N, \quad N = 0, 1, 2, \ldots \end{cases}$$

Figure 6:
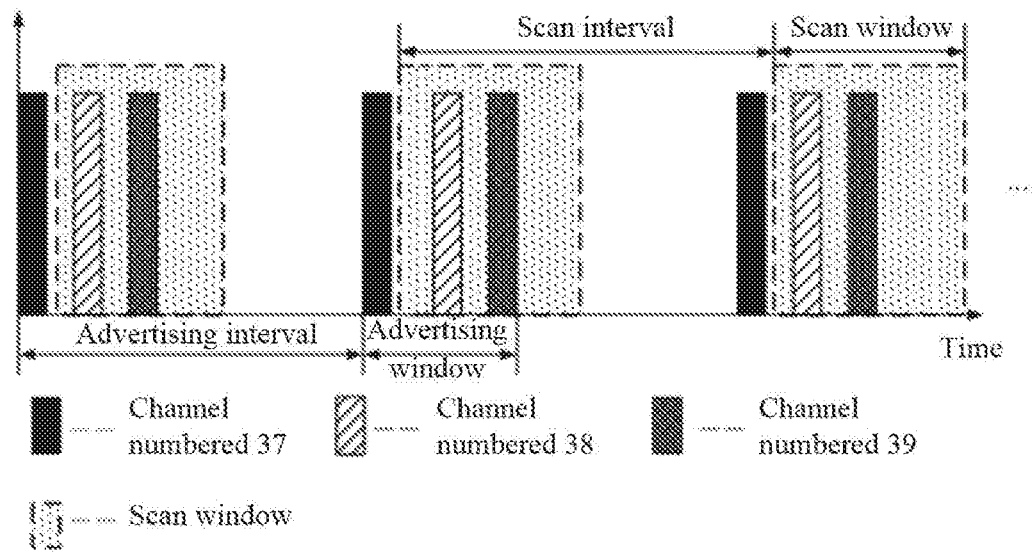
FIG. 6 is schematic diagram 2 of a scanning model according to an embodiment of this application.
Figure 7:
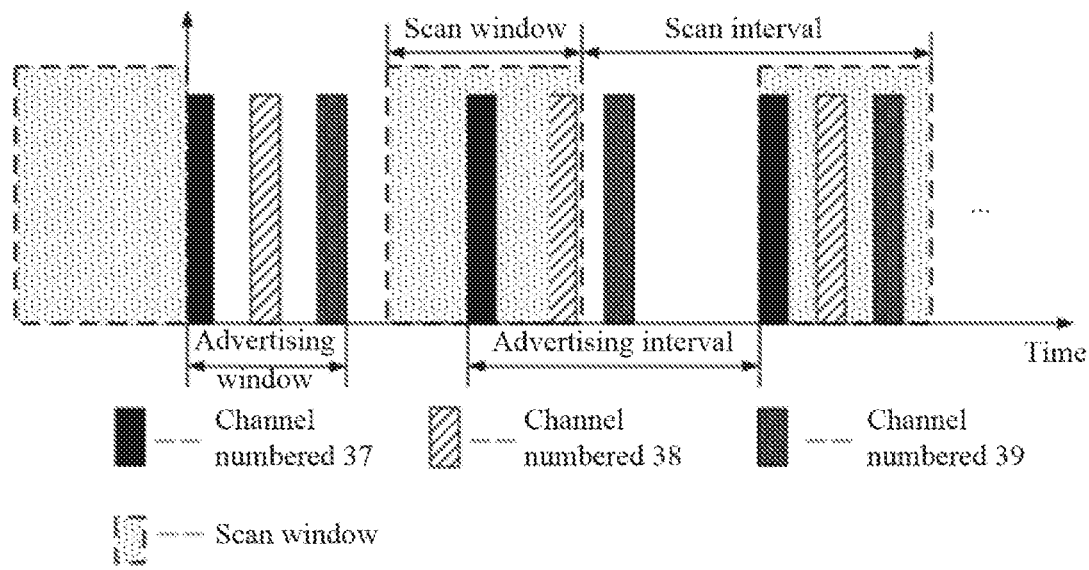
FIG. 7 is schematic diagram 3 of a scanning model according to an embodiment of this application.

During actual application, the scanning start time point may be the same as or different from the advertising start time point. It can be understood that during actual application, scanning may start at an advertising start time point, or scanning may start during advertising, or scanning may end at an advertising start time point. FIG. 5 shows a scenario in which scanning starts at an advertising start time point. With reference to FIG. 5, FIG. 6 shows a scenario in which scanning starts during advertising. With reference to FIG. 5, FIG. 7 shows a scenario in which scanning ends at an advertising start time point.

In this embodiment of this application, shift represents a time difference between a scanning start time point and an advertising start time point. With reference to FIG. 5, FIG. 6, and FIG. 7, it can be learned that a value range of shift is [0,scaninterval), and a scan formula may be expressed as:

$$Yscan = \begin{cases} 1, & t = [shift, shift + scanWindow) + scaninterval \times N, \quad N = 0, 1, 2, \ldots \\ 0, & t \neq [shift, shift + scanWindow) + scaninterval \times N, \quad N = 0, 1, 2, \ldots \end{cases}$$

It can be learned from the foregoing descriptions that a ratio of a scan window to a scan interval is a scan duty ratio, and the scan duty ratio determines power consumption of the first device. When the power consumption of the first device is a preset threshold, there is at least one scan parameter group, a ratio of a scan window to a scan interval in each scan parameter group is an independent variable of the first function, and the preset threshold is a functional value of the first function.

For example, if the scan window is expressed as a, the scan interval is expressed as b, and the preset threshold is expressed as c, the first function may be expressed as c=a/b, c=ln(a/b), or c=k−(a/b), where k>0.

The first device has obtained, in S401, the advertising window and the advertising interval that are used by the second device; therefore, the first device can determine, by using the foregoing advertising formula and the foregoing scan formula, a first scan-to-discover time period corresponding to each scan parameter group. Then, the first device can select the shortest first scan-to-discover time period from the determined first scan-to-discover time periods and determine the selected first scan-to-discover time period as a target scan-to-discover time period. A scan parameter corresponding to the target scan-to-discover time period is a target scan parameter.

Specifically, for each of the plurality of scan parameter groups, a value range of shift is always [0, scaninterval); therefore, for all scan parameter groups, the first device can determine a set consisting of different values of shift. For each scan parameter group, the first device can determine, based on the foregoing advertising formula and the foregoing scan formula, a second scan-to-discover time period corresponding to each value of shift. Then, the first device calculates, based on the calculated second scan-to-discover time period by using a preset algorithm, a first scan-to-discover time period corresponding to a corresponding scan parameter group. The preset algorithm may be an arithmetic average method, a weighted average method, or another algorithm. This is not specifically limited in this embodiment of this application.

For example, as shown in Table 1, if the preset algorithm is the arithmetic average method, power consumption of the first device is 1/9, and a first formula is c=a/b in the foregoing example, a value of the scan window is 1, and a value of the scan interval is 9; or a value of the scan window is 10, and a value of the scan interval is 90.

TABLE 1

| | Scan window | Scan interval | Shift | Second scan-to-discover time period | First scan-to-discover time period |
|---|---|---|---|---|---|
| Power consumption of a first device is 1/9 | 1 | 9 | shift1 | t1 | T1 |
| | | | shift2 | t2 | |
| | | | shift3 | t3 | |
| | 10 | 90 | shift4 | t4 | T2 |
| | | | shift5 | t5 | |
| | | | shift6 | t6 | |

In the scenario in which the value of the scan window is 1, and the value of the scan interval is 9, values of shift are shift1, shift2, and shift3. When the value of shift is shift1, the second scan-to-discover time period t1 can be calculated by using the foregoing advertising formula and the foregoing scan formula. When the value of shift is shift2, the second scan-to-discover time period t2 can be calculated by using the foregoing advertising formula and the foregoing scan formula. When the value of shift is shift3, the second scan-to-discover time period t3 can be calculated by using the foregoing advertising formula and the foregoing scan formula. The first device calculates an arithmetic average of t1, t2, and t3 to obtain the first scan-to-discover time period T1. In this case, T1 represents a scan-to-discover time period used in the scenario in which the value of the scan window is 1 and the value of the scan interval is 9.

In the scenario in which the value of the scan window is 10, and the value of the scan interval is 90, values of shift are shift4, shift5, and shift6. When the value of shift is shift4, the second scan-to-discover time period t4 can be calculated by using the foregoing advertising formula and the foregoing scan formula. When the value of shift is shift5, the second scan-to-discover time period t5 can be calculated by using the foregoing advertising formula and the foregoing scan formula. When the value of shift is shift6, the second scan-to-discover time period t6 can be calculated by using the foregoing advertising formula and the foregoing scan formula. The first device calculates an arithmetic average of t4, t5, and t6 to obtain the first scan-to-discover time period T2. In this case, T2 represents a scan-to-discover time period used in the scenario in which the value of the scan window is 10 and the value of the scan interval is 90.

If T1 is less than T2, the first device uses T1 as the target scan-to-discover time period, determines a scan window corresponding to T1 as the target scan window (with a value of 1), and determines a scan interval corresponding to T1 as the target scan interval (with a value of 9).

It can be understood that the values of shift shown in Table 1 are merely examples. During actual application, for each specific application scenario (for a scan parameter group), there is at least one value of shift.

A random delay added after an advertising event exerts relatively slight impact on determining the target scan parameter by the first device in this embodiment of this application; therefore, in this embodiment of this application, the random delay added after the advertising event may be negligible.

Specifically, after determining the target scan window and the target scan interval, the first device performs scanning for an advertising data packet sent by a second device, based on the target scan window and the target scan interval that are determined by the first device.

It can be learned that the first device in this embodiment of this application determines the target scan window and the target scan interval on a basis of taking power consumption of the first device and the scan-to-discover time period into consideration. In this way, when the first device performs scanning, based on the target scan window and the target scan interval, for the advertising data packet sent by the second device, a balance between the power consumption of the first device and the scan-to-discover time period can be implemented.

An embodiment of this application provides a scanning device. The scanning device is configured to perform the steps performed by the first device in the foregoing scanning method. The scanning device provided in this embodiment of this application may include modules corresponding to the corresponding steps.

In this embodiment of this application, function module division may be performed on the scanning device based on the examples of the method. For example, function modules may be divided for corresponding functions, or at least two functions may be integrated into one processing module. The integrated module may be implemented in a form of hardware, or may be implemented in a form of a software function module. The module division in this embodiment of this application is an example, and is merely logical function division, or may be other division during actual implementation.

Figure 8:
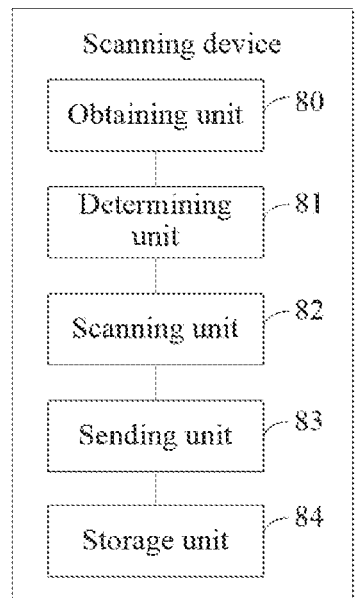
FIG. 8 is schematic structural diagram 1 of a scanning device according to an embodiment of this application.

When function modules are divided for corresponding functions, FIG. 8 is a possible schematic structural diagram of a scanning device in the foregoing embodiment. As shown in FIG. 8, the scanning device includes an obtaining unit 80, a determining unit 81, and a scanning unit 82. The obtaining unit 80 is configured to support the scanning device in performing S401 in FIG. 4. The determining unit 81 is configured to support the scanning device in performing S402 in FIG. 4. The scanning unit 82 is configured to support the scanning device in performing S403 in FIG. 4. All related content of each step in the foregoing method embodiments may be cited in function descriptions of a corresponding function module, and details are not described herein again. In addition, the scanning device provided in this embodiment of this application further includes a sending unit 83 and a storage unit 84. The sending unit 83 is configured to support the scanning device in performing S400 in FIG. 4. The storage unit 84 is configured to store an advertising window and an advertising interval that are used by a second device to send an advertising data packet, and may also be configured to store program code and data that are used for the scanning.

Figure 9:
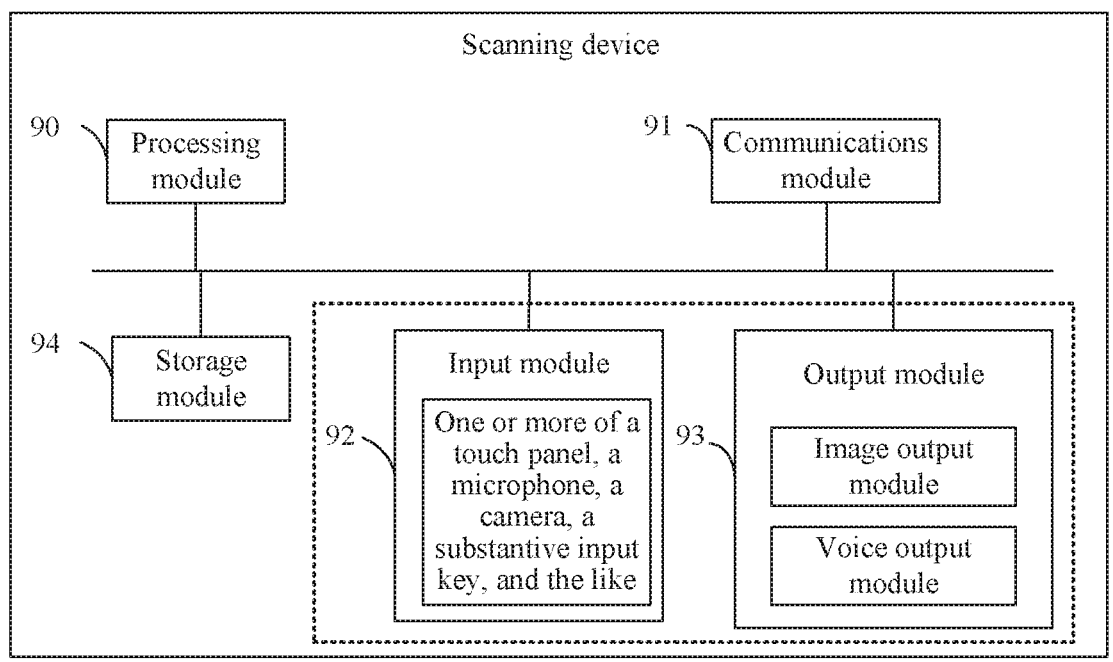
FIG. 9 is schematic structural diagram 2 of a scanning device according to an embodiment of this application.

When an integrated unit is used, FIG. 9 is a possible schematic structural diagram of the scanning device in the foregoing embodiment. As shown in FIG. 9, the scanning device includes a processing module 90 and a communications module 91. The processing module 90 is configured to perform control management on an action of the scanning device. For example, the processing module 90 is configured to support the scanning device in performing S402 and S403 in FIG. 4, and/or is configured to perform other processes of the technology described in this application. The communications module 91 is configured to support the scanning device in communicating with an external device. For example, the communications module 91 is configured to support the scanning device in performing S400 and S401 in FIG. 4.

The processing module 90 in this embodiment of this application may be a processor or a controller, for example, a central processing unit (Central Processing Unit, CPU) or a digital signal processor (Digital Signal Processor, DSP). The processing module 90 may implement or execute various example logical blocks, modules, and circuits described with reference to content disclosed in this application.

The communications module 91 in this embodiment of this application may be a Bluetooth module that exchanges data with the external device, and may further include an RF circuit corresponding to the Bluetooth module. The RF circuit is configured to receive/send a signal during information receiving/sending or during a call.

The communications module 91 in this embodiment of this application may alternatively be a communications interface (English full name: Communication Interface) that exchanges data with the external device. The communications module may include two communications interfaces: a sending interface configured to send data to the external device and a receiving interface configured to receive data from the external device. That is, the scanning device can send data and receive data by using the two different communications interfaces respectively. Certainly, the communications module 91 may integrate a data receiving function and a data sending function into one communications interface. The communications interface has the data receiving function and the data sending function. The communications interface may be integrated onto a Bluetooth chip or an NFC chip.

The communications module 91 in this embodiment of this application may alternatively be a transceiver, a transceiver circuit, or the like.

Optionally, as shown in FIG. 9, the scanning device may further include some input modules 92 configured to implement interaction between a user and the scanning device.

The input module 92 may receive digital or character information entered by a user, to generate signal input related to user settings or function control. In a specific implementation of this application, the input module 92 may be a touch panel, or may be another man-machine interface such as a substantive input key or a microphone, or may be another external apparatus for collecting information such as a camera.

In another implementation of this application, the substantive input key serving as the input module 92 may include but is not limited to one or more of a physical keyboard, a function key (such as a volume control key or an on/off key), and the like. The input module 92 in a form of a microphone may collect voice entered by a user or from an environment and convert the voice into a command that is in a form of an electrical signal and that can be executed by the processing module 90.

Optionally, as shown in FIG. 9, the scanning device may further include some output modules 93 configured to implement interaction between a user and the scanning device.

The output module 93 includes but is not limited to an image output module and a sound output module. The image output module is configured to output a text, a picture, and/or a video. The image output module may include a display panel, for example, a display panel configured in a form of a liquid crystal display (Liquid Crystal Display, LCD), an organic light-emitting diode (Organic Light-Emitting Diode, OLED), a field emission display (Field Emission Display, FED), or the like. The image output module may include a single display panel or a plurality of display panels of different sizes. In a specific implementation of this application, the touch panel serving as the input module 92 may also serve as the display panel of the output module 93. For example, after detecting a touch on the touch panel or a gesture operation near the touch panel, the touch panel transmits the touch event to the processing module 90 to determine a touch event type, and then the processing module 90 provides corresponding visual output on the display panel based on the touch event type.

As shown in FIG. 9, the input module 92 and the output module 93 may be used as two separate components to implement input and output functions of the scanning device. However, in some embodiments, the input module 92 and the output module 93 may be integrated as a whole to implement the input and output functions of the scanning device (as shown in FIG. 9, the input module 92 and the output module 93 are included in one dotted-link block, to indicate that the input module 92 and the output module 93 are integrated as a whole).

Optionally, the scanning device in this embodiment of this application further includes a storage module 94 configured to store a target scan window and a target scan interval.

The storage module 94 may be a memory.

Figure 10:
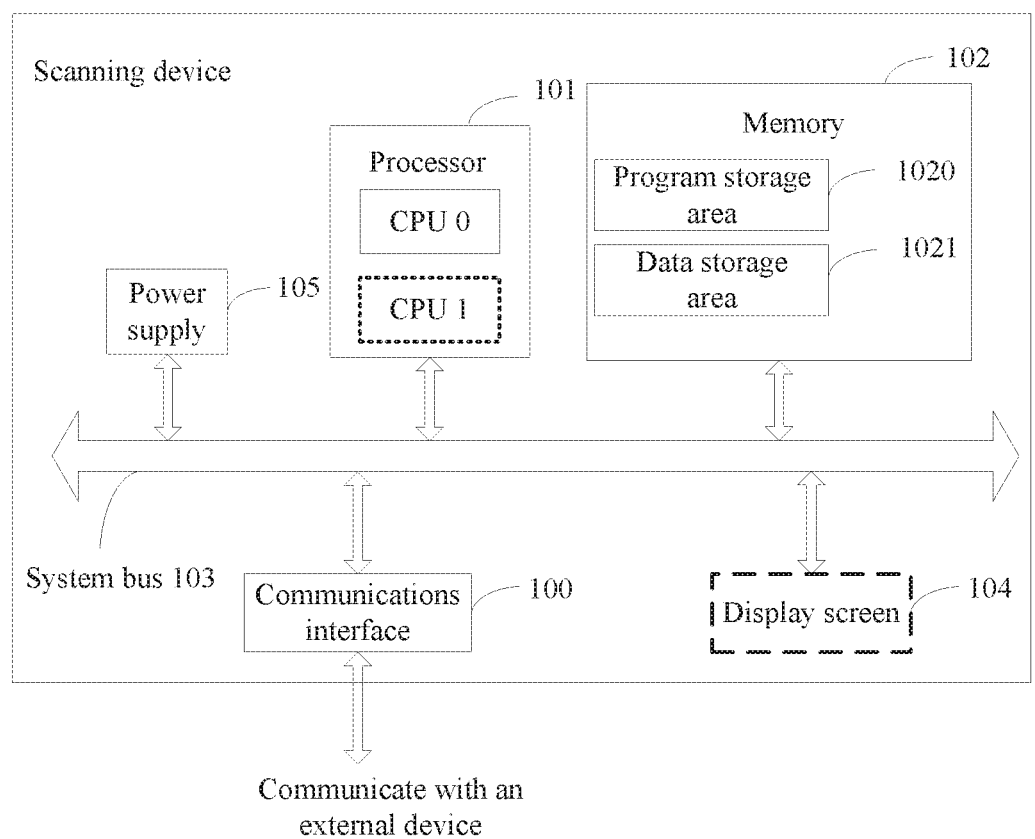
FIG. 10 is schematic structural diagram 3 of a scanning device according to an embodiment of this application.

When the processing module 90 is a processor, the communications module 91 is a communications interface, the input module 92 and the output module 93 may be a same display screen, and the storage module 94 is a memory, the scanning device in this embodiment of this application may be a scanning device shown in FIG. 10.

As shown in FIG. 10, the scanning device includes a communications interface 100, a processor 101, and a memory 102. The communications interface 100, the processor 101, and the memory 102 are connected by using a system bus 103, and complete mutual communication.

When the scanning device runs, the scanning device performs the scanning method in the embodiment shown in FIG. 4. For the specific scanning method, refer to related descriptions in the embodiment shown in FIG. 4, and details are not described herein again.

The memory 102 may be configured to store the determined target scan window and target scan interval, and may also be configured to store a software program and an application module. The processor 101 runs the software program and the application module that are stored in the memory 102, to execute various function applications and data processing.

The memory 102 may mainly include a program storage area 1020 and a data storage area 1021. The program storage area 1020 may store an operating system, an application program required by at least one function, for example, obtaining an advertising window and an advertising interval that are used by the second device, and the like. The data storage area 1021 may store the target scan window and the target scan interval. In this implementation of this application, the operating system may be an Android (Android) system, an iOS system, a Windows operating system, or the like; or may be an embedded operating system such as VxWorks.

In a specific implementation of this application, the memory 102 may include a volatile memory, for example, a nonvolatile dynamic random access memory (Nonvolatile Random Access Memory, NVRAM), a phase change random access memory (Phase Change RAM, PRAM), or a magnetoresistive random access memory (Magnetic Random Access Memory, MRAM); and the memory 102 may further include a non-volatile memory, for example, at least one disk storage device, an electrically erasable programmable read-only memory (Electrically Erasable Programmable Read-Only Memory, EEPROM), or a flash memory device such as a NOR flash memory (NOR flash memory) or a NAND flash memory (NAND flash memory). The nonvolatile memory stores the operating system and the application program executed by the processor 101. The processor 101 loads a running program and data from the nonvolatile memory to the memory, and stores data content into a large-capacity storage apparatus.

The memory 102 may exist independently, and is connected to the processor 101 by using the system bus 103. The memory 102 may alternatively be integrated with the processor 101.

The processor 101 is a control center of the scanning device. The processor 101 is connected to various components of the entire scanning device by using various interfaces and lines. The processor 101 runs or executes the software program and/or the application module stored in the memory 102, and invokes data stored in the memory 102, to execute various functions of the scanning device and process data, so as to monitor the entire scanning device.

The processor 101 may include only a CPU, or may be a combination of a CPU, a graphic processing unit (Graphic Processing Unit, GPU), a DSP, and a control chip (for example, a baseband chip) of a communications unit. In this implementation of this application, the CPU may be a single computing core, or may include a plurality of computing cores. During specific implementation, in an embodiment, the processor 101 may include one or more CPUs. For example, the processor 101 in FIG. 10 includes a CPU 0 and a CPU 1.

The system bus 103 may be an industry standard architecture (Industry Standard Architecture, ISA) bus, a peripheral component interconnection (Peripheral Component Interconnect. PCI) bus, an extended industry standard architecture (Extended Industry Standard Architecture, EISA) bus, or the like. The system bus 103 may be classified into an address bus, a data bus, a control bus, and the like. For clear description in this embodiment of this application, various buses are marked as the system bus 104 in FIG. 10.

Optionally, the scanning device may further include a display screen 104 expressed by a dashed-line block in FIG. 10.

Further, the scanning device may further include a power supply 105 configured to supply power to different components of the scanning device, to maintain running of the scanning device. Generally, the power supply 105 may be a built-in battery, for example, a common lithium-ion battery or a nickel metal hydride battery, or may be an external power supply that directly supplies power to the scanning device, for example, an alternating-current (Alternating Current, AC) adapter. In some implementations of this application, the power supply 105 may have more extensive definitions. For example, the power supply 105 may further include a power management system, a charging system, a power supply failure detection circuit, a power supply convener or inverter, a power supply status indicator (for example, a light-emitting diode), and any other components related to electric energy generation, management, and distribution of the scanning device.

Correspondingly, another embodiment of this application further provides a computer-readable storage medium. The computer-readable storage medium includes one or more groups of program code. The one or more programs include instructions. When a processor of a scanning device executes the program code, the scanning device performs the scanning method shown in FIG. 4.

All or some of the foregoing embodiments may be implemented by using a software procedure, hardware, firmware, or any combination thereof. When a software program is used to implement the embodiments, all or some of the embodiments may be implemented in a form of a computer program product. The computer program product includes one or more computer instructions. When the computer program instructions are loaded and executed on the computer, all or some of the procedures or functions described according to the embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (Solid State Disk (SSD)), or the like.

The foregoing descriptions about implementations allow a person skilled in the art to understand that, for the purpose of convenient and brief description, division of the foregoing function modules is taken as an example for illustration. During actual application, the foregoing functions can be allocated to different modules and implemented according to a requirement, that is, an inner structure of an apparatus is divided into different function modules to implement all or some of the foregoing functions. For a specific working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and components displayed as units may or may not be physical units, may be located in one position, or may be distributed onto a plurality of network units. Some or all of the units may be selected according to actual requirements to achieve the objectives of the solutions of the embodiments.

In addition, functional units in the embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The software product is stored in a storage medium and includes several instructions for instructing a computer device (which may be a personal computer, a server, a network device, or the like) or a processor to perform all or some of the steps of the methods described in the embodiments of this application. The foregoing storage medium includes any medium that can store program code such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A scanning method, comprising:
sending, by a first device to a server, a request message carrying an identifier of a second device to request to obtain an advertising window and an advertising interval;
receiving, by the first device, a response message from the server, wherein the response message carries the advertising window and the advertising interval;
determining, by the first device based on the advertising window and the advertising interval using a preset scanning model, a target scan parameter used by the first device, wherein the target scan parameter is a scan parameter used by the first device when power consumption of the first device is a preset threshold and a scan-to-discover time period satisfies a preset condition, wherein the target scan parameter comprises a target scan window and a target scan interval, wherein the preset condition is that a time period is shortest, and wherein determining the target scan parameter comprises:
determining, by the first device, a plurality of scan parameter groups based on the preset threshold, wherein each of the plurality of scan parameter groups comprises a scan window and a scan interval, wherein the preset threshold is a functional value of a first function, and wherein an independent variable of the first function is a ratio of the scan window to the scan interval;
determining, by the first device based on the advertising window and the advertising interval using the preset scanning model, a first scan-to-discover time period corresponding to each scan parameter group to obtain a plurality of first scan-to-discover time periods;
determining, by the first device, a first scan-to-discover time period that is the shortest among the plurality of first scan-to-discover time periods as a target scan-to-discover time period; and
determining, by the first device, a scan parameter corresponding to the target scan-to-discover time period as the target scan parameter; and
performing, by the first device, scanning based on the target scan window and the target scan interval,
wherein, for each of the plurality of scan parameter groups, determining, by the first device based on the advertising window and the advertising interval using the preset scanning model, the first scan-to-discover time period further comprises:

determining at least one scanning start time point;

determining a time difference set based on one of the plurality of scan parameter groups, wherein the time difference set comprises at least one time difference, wherein a jth time difference in the at least one time difference is used to represent a difference between a jth scanning start time point in the at least one scanning start time point and an advertising start time point, and wherein j≥1;

calculating, based on the advertising window, the advertising interval, and the one scan parameter group using the scanning model, a second scan-to-discover time period corresponding to each of the at least one time difference to obtain a plurality of second scan-to-discover time periods; and calculating, the plurality of second scan-to-discover time periods using a preset algorithm to obtain a first scan-to-discover time period corresponding to the one scan parameter group.

2. The scanning method of claim 1, wherein the scanning start time point is the same as the advertising start time point.

3. The scanning method of claim 1, wherein the server is a background server.

4. The scanning method of claim 1, further comprising storing the target scan window and the target scan interval.

5. The scanning method of claim 1, wherein the server is a cloud server.

6. The scanning method of claim 1, wherein the first device is a Bluetooth low energy (BLE) scanning device.

7. A scanning device, comprising:

a processor; and a memory coupled to the processor and configured to store instructions that, when executed by the scanning device, cause the scanning device to be configured to:

send, to a server, a request message configured to carry an identifier of a second device, wherein the request message requests an advertising window and an advertising interval;

receive a response message from the server, wherein the response message carries the advertising window and the advertising interval;

determine, based on the advertising window and the advertising interval using a preset scanning model, a target scan parameter used by the scanning device, wherein the target scan parameter is a scan parameter used by the scanning device when power consumption of the scanning device is a preset threshold and a scan-to-discover time period satisfies a preset condition, wherein the target scan parameter comprises a target scan window and a target scan interval, and wherein the target scan parameter used by the scanning device is determined by:

determining a plurality of scan parameter groups based on the preset threshold, wherein at least one of the plurality of scan parameter groups comprises a scan window and a scan interval, wherein the preset threshold is a functional value of a first function, and wherein an independent variable of the first function is a ratio of the scan window to the scan interval;

determining, based on the advertising window and the advertising interval using the preset scanning model, a first scan-to-discover time period corresponding to at least one of the plurality of scan parameter groups to obtain a plurality of first scan-to-discover time periods;

determining the first scan-to-discover time period that is the shortest among the plurality of first scan-to-discover time periods as a target scan-to-discover time period; and determining the scan parameter corresponding to the target scan-to-discover time period as the target scan parameter; and perform a scan based on the target scan window and the target scan interval, wherein, for each of the plurality of scan parameter groups, the first scan-to-discover time period corresponding to the at least one of the plurality of scan parameter groups is further determined by:

determining at least one scanning start time point;

determining a time difference set based on one of the plurality of scan parameter groups, wherein the time difference set comprises at least one time difference, wherein a jth time difference in the at least one time difference is configured to represent a difference between a jth scanning start time point in the at least one scanning start time point and an advertising start time point, and wherein j≥1;

calculating, based on the advertising window, the advertising interval, and the one scan parameter group using the scanning model, a second scan-to-discover time period corresponding to each of the at least one time difference to obtain a plurality of second scan-to-discover time periods; and calculating the plurality of second scan-to-discover time periods using a preset algorithm to obtain a first scan-to-discover time period corresponding to the one scan parameter group.

8. The scanning device of claim 7, wherein the scanning start time point is the same as the advertising start time point.

9. The scanning device of claim 7, wherein the server is a background server.

10. The scanning device of claim 7, further comprising storing the target scan window and the target scan interval.

11. The scanning device of claim 7, wherein the server is a cloud server.

12. The scanning device of claim 7, wherein the scanning device is a Bluetooth low energy (BLE) scanning device.

13. A non-transitory computer-readable medium storing instructions that, when executed by a processor, cause a scanning device to:

send, to a server, a request message carrying an identifier of a second device to request to obtain an advertising window and an advertising interval, wherein the server stores the advertising window and the advertising interval;

receive a response message from the server, wherein the response message carries the advertising window and the advertising interval;

determine based on the advertising window and the advertising interval using a preset scanning model, a target scan parameter used by the scanning device, wherein the target scan parameter is a scan parameter used by the scanning device when power consumption of the scanning device is a preset threshold and a scan-to-discover time period satisfies a preset condition, wherein the preset condition is a shortest time period, wherein the target scan parameter comprises a target scan window and a target scan interval, and wherein the instructions are configured to cause the scanning device to determine the target scan parameter by causing the scanning device to:

determine a plurality of scan parameter groups based on the preset threshold, wherein at least one of the plurality of scan parameter groups comprises a scan window and a scan interval, wherein the preset threshold is a functional value of a first function, and wherein an independent variable of the first function is a ratio of the scan window to the scan interval;

determine based on the advertising window and the advertising interval by using the preset scanning model, a first scan-to-discover time period corresponding to at least one of the plurality of scan parameter groups to obtain a plurality of first scan-to-discover time periods;

determine the first scan-to-discover time period that is the shortest among the plurality of first scan-to-discover time periods as a target scan-to-discover time period; and determine the scan parameter corresponding to the target scan-to-discover time period as the target scan parameter; and perform a scan based on a target scan window and the target scan interval, wherein, for each of the plurality of scan parameter groups, the determining based on the advertising window and the advertising interval using the preset scanning model, the first scan-to-discover time period further comprises:

determining at least one scanning start time point;

determining a time difference set based on one of the plurality of scan parameter groups, wherein the time difference set comprises at least one time difference, and a jth time difference in the at least one time difference is configured to represent a difference between a jth scanning start time point in the at least one scanning start time point and an advertising start time point, and wherein j≥1;

calculating based on the advertising window, the advertising interval, and the one scan parameter group using the scanning model, a second scan-to-discover time period corresponding to each of the at least one time difference to obtain a plurality of second scan-to-discover time periods; and calculating the plurality of second scan-to-discover time periods using a preset algorithm, to obtain a first scan-to-discover time period corresponding to the one scan parameter group.

14. The computer-readable medium of claim 13, wherein the scanning start time point is the same as the advertising start time point.

15. The computer-readable medium of claim 13, wherein the server is a background server.

16. The computer-readable medium of claim 13, wherein the instructions further cause the scanning device to store the target scan window and the target scan interval.

17. The computer-readable medium of claim 13, wherein the server is a cloud server.

\* \* \* \* \*